Oct. 27, 1959 R. M. MAGNUSON 2,910,392
METHOD OF REMOVING THE SKIN OF FRUIT AND VEGETABLE ARTICLES
Filed Aug. 17, 1953 6 Sheets-Sheet 1
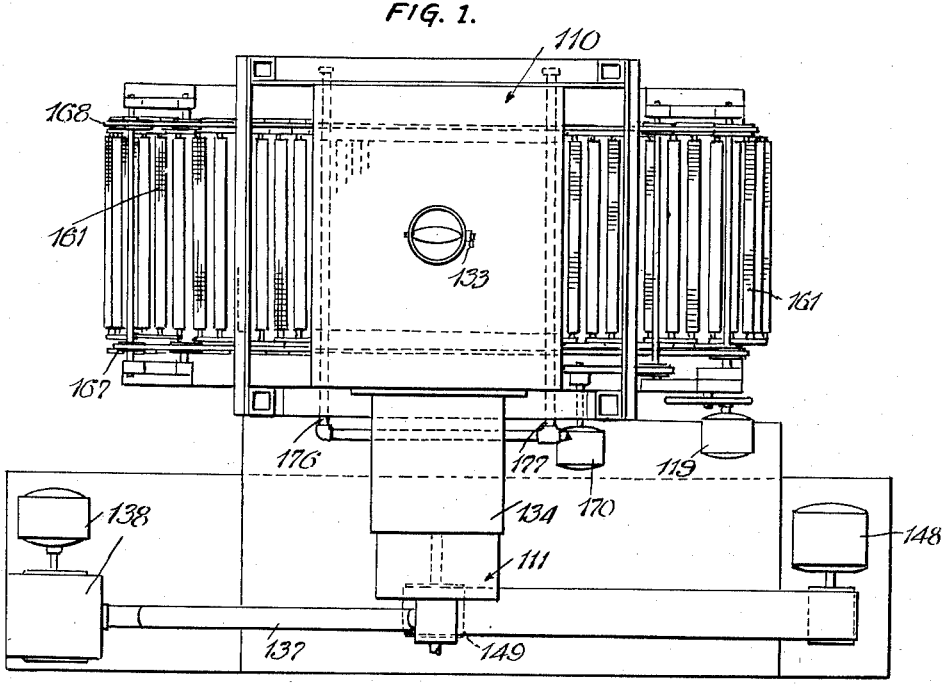
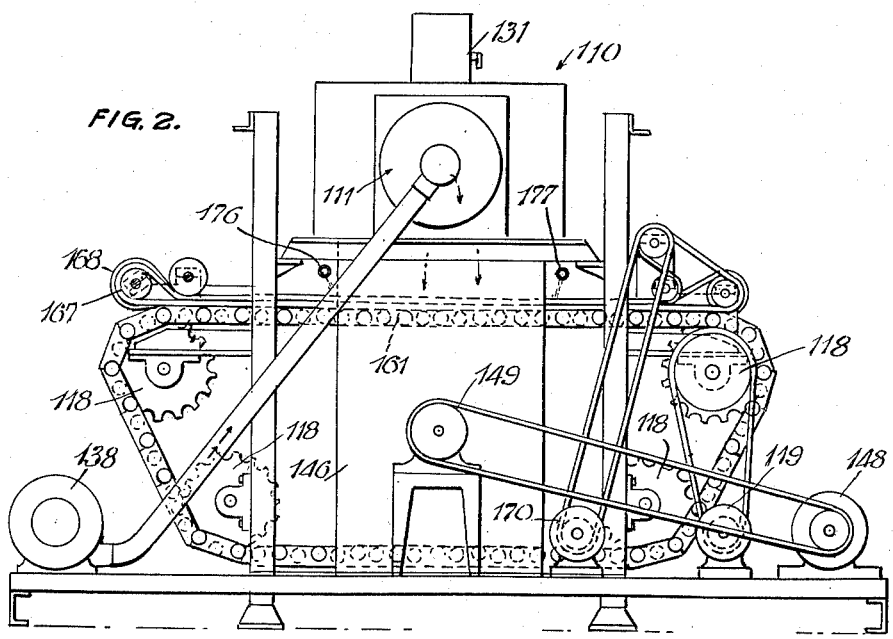
INVENTOR
ROY M. MAGNUSON
BY Harper Allen
ATTORNEY Oct. 27, 1959 R. M. MAGNUSON 2,910,392
METHOD OF REMOVING THE SKIN OF FRUIT AND VEGETABLE ARTICLES
Filed Aug. 17, 1953 6 Sheets-Sheet 2

INVENTOR
ROY M. MAGNUSON
BY Harper Green
ATTORNEY

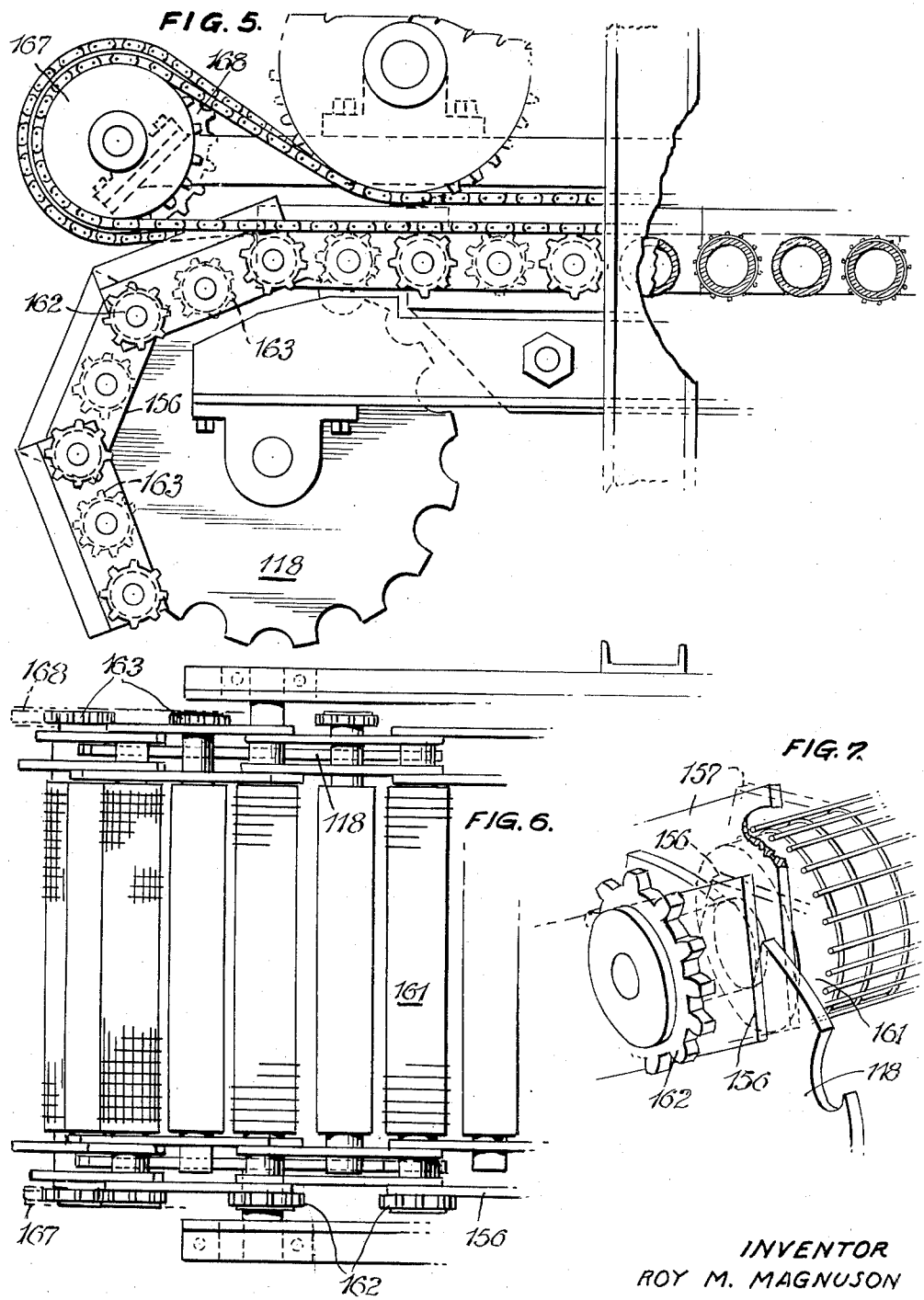

Oct. 27, 1959     R. M. MAGNUSON     2,910,392
METHOD OF REMOVING THE SKIN OF FRUIT AND VEGETABLE ARTICLES
Filed Aug. 17, 1953     6 Sheets-Sheet 4

INVENTOR.
ROY M. MAGNUSON
BY Harper Allen
ATTORNEY.

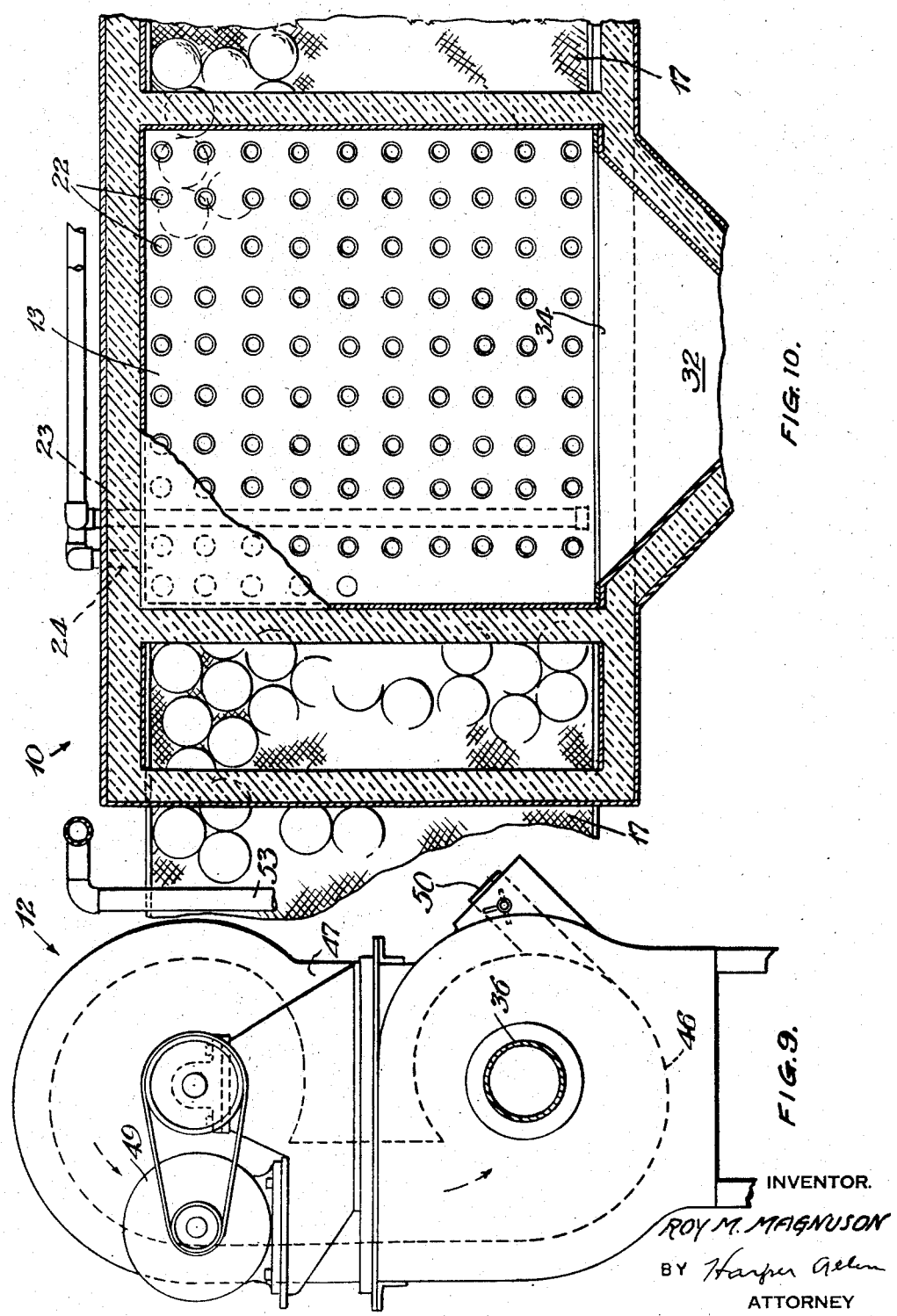

INVENTOR.
ROY M. MAGNUSON
BY Harper Allen
ATTORNEY.

United States Patent Office 2,910,392
Patented Oct. 27, 1959

2,910,392

METHOD OF REMOVING THE SKIN OF FRUIT AND VEGETABLE ARTICLES

Roy M. Magnuson, Santa Clara County, Calif.; Genevieve I. Magnuson, executrix of said Roy M. Magnuson, deceased, assignor of one-half to California Packing Corporation, a corporation of New York Application August 17, 1953, Serial No. 374,752

4 Claims. (Cl. 146—241)

This application is a continuation-in-part of my copending application, Serial No. 226,512, filed May 15, 1951, now abandoned.

The present invention is concerned with the peeling of fruit and vegetable articles, and relates more particularly to new means and process for loosening and removing the skin in an advantageous and automatic manner without objectional oxidizing, charring or the like.

Previous high temperature processes on fruit and vegetable articles have been concerned with conditioning the skin thereof for removal, and have not attempted the actual separation of the skin from the body of the fruit or the actual removal of the skin. In the present invention, in addition to conditioning of the skin, actual skin or peel separation or removal is effected automatically, and in production operation all of the articles, or a high percentage of the articles, will have the bond between the skin and the body of the article broken or will be completely peeled.

The invention, therefore, has for its primary object the peeling of fruit or vegetable articles in an automatic manner.

A further object of the invention is to provide an apparatus and process which will not only result in automatic peeling but which will provide for an improved yield in the product. For example, with articles such as tomatoes, the process will provide for an increase in the number of fancy tomatoes in the peeled product, the removal of a minimum skin thickness, and will reduce in general the losses involved in machine processing.

Another object of the invention is to provide a process which allows treating of fruit and vegetable articles at a lower temperature than previously known high temperature processes to obtain satisfactory skin loosening prior to peel removal.

The above and other objects of the invention are attained in connection with a preferred embodiment of the invention as described herein, and as illustrated in the accompanying drawings, in which:

Figures 1 through 7 illustrate one form of the invention.

Figure 1 is a plan view of one form of the apparatus embodying the invention.

Figure 2 is a side elevational view of the apparatus.

Figure 3 is a transverse sectional view through the apparatus.

Figure 4 is a fragmentary plan view taken as indicated by the line 4—4 in Figure 3.

Figure 5 is an enlarged side elevational view partially in section, illustrating the discharge end of the apparatus.

Figure 6 is a plan view of the portion of the apparatus shown in Figure 5.

Figure 7 is a perspective view of one end of a roll having a special drive surface thereon.

Figures 8 through 11 illustrate a second form of the invention.

Figure 8 is an end elevational view partly in section of apparatus for carrying out the process.

Figure 9 is an elevational view of the velocity unit.

Figure 10 is a fragmentary sectional plan view taken in a plane indicated by the line 10—10 in Figure 9.

Figure 11 is a fragmentary longitudinal sectional view illustrating the arrangement of the upper and lower nozzle means with respect to the fruit being treated.

Figure 3:
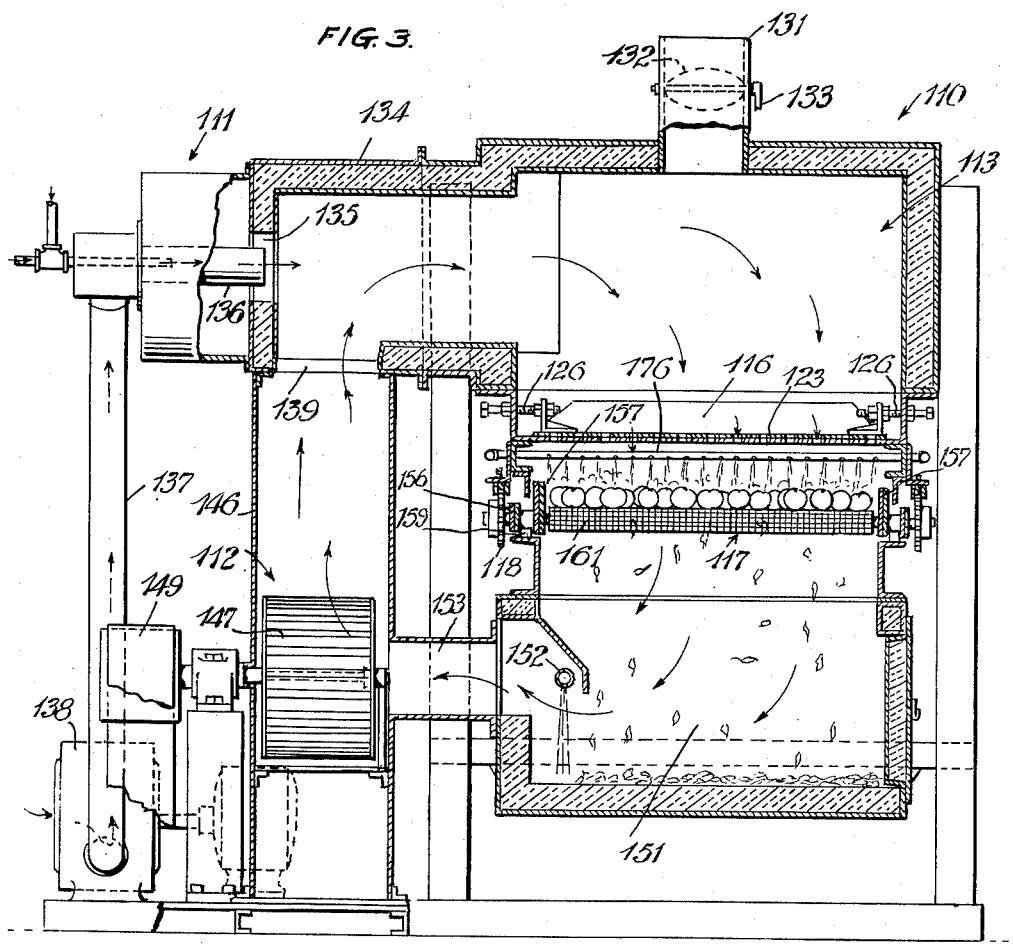

The process will be described with reference to the peeling of tomatoes, although it will be obvious that the process will be applicable to other fruit and vegetable articles of the type commonly processed in high temperature peeling operations, as well as others not normally peeled in this manner. In general the process can be applied to fruit or vegetable articles which either have an established line of separation between the skin and the body of the article, or have a line of separation capable of being created by treatment with a hot gaseous flame-free treating medium.

Prior to the actual processing, as described herein, an article to be peeled is first subjected to conventional washing and sorting operations so that clean, defect-free articles are carried through the peeling process. In the case of tomatoes, as specifically described herein, the articles may be cored prior to being subjected to the process, or they may be cored prior to being subjected to the process, or they may be cored after the process. The particular location of the coring step will depend partially upon the character of the article being treated and plant conditions.

After the articles have been washed, sorted and treated in any desired manner in preparation for the peeling operation, the articles are carried or transferred immediately into a heat application zone where they are subjected to a heating medium applied thereto in an advantageous manner. The rate of travel through the heating zone is controlled with respect to the specific article or tomatoes being peeled to provide the most desirable time of heating.

Desirably, the heating zone is substantially entirely enclosed, except for the provision for entrance and exit of the articles, and the treating and peeling medium or mediums, and this heating zone is provided with a heating medium produced by combustion of a fuel. The amount of gas or fuel and air introduced to the burner is such that substantially complete combustion of fuel takes place, and a minimum amount of excess oxygen over and above the amount necessary for complete combustion is introduced. The hot gaseous flame-free treating atmosphere thus produced has imparted thereto velocity to provide for peel separation or peel removal and to aid in heat transfer operations, as explained later in detail.

During passage of the product through the treating chamber, the first effect of the hot treating medium on tomatoes is to effect a blistering of the skin and skin cracking, this result being effected in an improved and desirable manner by virtue of the velocity of the heating medium. The heating medium immediately adjacent to the skin which is cooled by application thereto, is swept away immediately and replaced by an uncooled portion of the treating atmosphere. Because of the velocity of the treating medium the heating of the article to cause blistering is substantially uniform so that the blistering effect takes place between the outer layer of skin and the flesh of the tomato over substantially its entire surface. The result is a puffing out or expanding of the skin with reference to the body of the tomato to provide a zone of slippage, which zone contains at least in part hot gases. Upon cracking the skin, it will within a short interval, sufficient for removal of the skin, return into engagement with the surface of the tomato. The skin portion which is loosened or rendered free or substantially free of the tomato, is the outer thin protective wax-like layer of the skin of the tomato, and the surface of the tomato still carries a tender, rough gelatinous layer, which in conventional processes would be removed as a part of the skin proper.

At the time of blistering or cracking of the skin, the tomatoes are subjected to a velocity of the treating medium or a velocity of a fluid medium which will, in effect, take hold of the free edges along the cracks and peel back the skin to remove it in a rapid and effective manner. This fluid medium for effecting the actual peeling is preferably the treating medium itself, if its velocity is sufficient for peel separation or removal, or it may be introduced as a separate entity at the location along the path of travel of the products where skin blistering and cracking of a major portion or substantially all of the tomatoes has occurred. This peeling medium therefore becomes effective while the skin is blistered and while the zone of slippage between the blistered skin and the body of the tomato is still maintained. Preferably the treating and peeling medium is directed from above toward the layer of tomatoes and the tomatoes, positioned in valleys, are rotated during their treatment to insure exposure of all sides to the peeling medium. The pressure effect of the medium resists any tendency of the tomatoes to move out of the valleys. The jets of the peeling medium are preferably positioned vertically at right angles to the direction of travel of the articles. In one form of the invention these jets are placed both above and below the tomatoes, and optimum results have been obtained with the upper jets inclined from the vertical substantially 15 degrees toward the exit end of the treating chamber, the lower jets in opposed relation thereto. For both skin conditioning and skin removal good results have been obtained with a set of nozzles positioned entirely at one side of the articles, in which case the tomatoes are subject to a rotative driving effect so as to enable the treatment of all sides and to provide a driving and a bumping action to enhance the peel removal.

After being subjected to the peeling medium the tomatoes are passed through a curtain of cooling water and discharged.

It is preferred to adjust the conditions of operation so that the skin which is removed from the tomato is carried by the conveyer from the treating chamber and is removed from the conveyer after discharge of the peeled tomatoes. Any skin fragments which become sufficiently burned or charred so that they do not deposit on the conveyer are discharged with treating and peeling mediums and are subsequently separated therefrom where the gases are recirculated for reuse on the tomatoes. In one form of the invention steam is used as a peeling fluid and as recirculation is employed, it serves as a source of additional moisture for the treating medium. The steam also serves to wet the skins and thereby lower the temperature and retard char formation. Other hot gases, such as combustion products, may be employed as the peeling medium. Preferably, however, the treating medium itself is used as the peeling medium and recirculated with the addition of steam if desired for the purposes noted above.

The velocity of the treating atmosphere is preferably not below 60 to 75 miles per hour and has as an upper limit a velocity below that which will bodily remove flesh from a fruit or a vegetable article of sound character. With fruit and vegetable articles this upper limit will vary depending upon the particular article being treated, its ripeness and condition. Within the range of available velocities varying results will be obtained at any given velocity depending on the ripeness and character of the fruit, and the actual optimum velocity for a given fruit or vegetable article can be determined by experimentation so that optimum conditions will obtain for a given fruit or vegetable article during the processing, as field conditions vary the quality of the article. Also, as common in canneries, different lots of articles are received from different localities and different fields so that the processing can be adjusted to the article as it is received, and in accordance with the desired use of the tomatoes; i.e., as a fancy pack or tomatoes for catsup as examples.

In general, the temperature of the treating atmosphere (plenum temperature) can be between 600 and 1100 degrees F. and the processing time can be from 40 seconds to as little as 5 seconds. With late season, vine-ripened Pearson tomatoes, good results have been obtained with the temperature of the treating atmosphere of 650 to 800 degrees F. (plenum temperature) and with the processing time of 27 to 15 seconds. The temperature of the atmosphere contacting the tomatoes is from 100 to 175 degrees F. below plenum.

In processing tomatoes with the preferred form of apparatus shown in Figures 1–7, effective peel separation or removal is obtained employing the treating medium as the peel removing medium by providing 5/8" holes spaced on 1½" centers transversely of the machine and on 3" centers longitudinally of the machine in the direction of travel of the conveyer and these holes are spaced above the upper surface of the rollers supporting the tomatoes for adequate clearance.

The velocity of the treating medium employed is given in the following table for different sizes of holes or orifices, as measured in the apparatus of Figures 1–7:

| Velometer Readings (Taken at an Orifice) | Static Pressure of Plenum Chamber | Orifice Size, inches |
|---|---|---|
| 13,000 f.p.m. (approx. 148 m.p.h.) | 6" $H_2O$ | 5/8 |
| 14,400 f.p.m. (approx. 163 m.p.h.) | 6.6" $H_2O$ | .483 |

In processing tomatoes by another preferred form of the invention disclosed in Figures 8–11, effective peel removal is obtained by placing a transverse row of nozzles of 1/32 inch opening spaced ½ inch apart and with their discharge openings ½ inch from the lower surface of the tomatoes with a jet velocity as determined by a steam jet under a head of substantially 17 p.s.i. gauge pressure which provides an estimated velocity at the jet of between 40,000 and 60,000 f.p.m. The upper row of jets being spaced farther from the articles being treated for clearance purposes, will have a correspondingly higher jet pressure to provide the same steam velocity at the articles.

In actual operation, in a tomato processing plant, it has been found difficult, due to the varying conditions of tomatoes being peeled, to obtain an adjustment of the conditions which will result in 100% skin separation or peeling of the articles being treated, however, it has been found possible to completely peel from 40% to 80%, and often a higher percentage of the articles, with the remainder of the articles having over half of the peel separated or removed. Any remaining peel on the tomatoes can be very easily slip-peeled so that any portions of the skin left can be very easily removed.

The above process in effect may be used to perform a sorting function to separate fancy tomatoes suitable for solid pack from other tomatoes by allowing all tomatoes which have fragments or portions of skin remaining because of some defect on the tomato to pass on to another operation, and removing the tomatoes which are entirely peeled for the "solid pack" operation. This sorting function can be employed advantageously because the uniformity with which the tomatoes peel is a better measure of quality and/or maturity than the eye.

Referring to the form of the invention shown in Figures 1 through 7, the apparatus includes generally a treating unit 110, an atmosphere generating unit 111, and a velocity imparting unit 112. The treating unit 110 is adapted to receive a high velocity treating and peeling atmosphere from the combined operation of the units 111 and 112 and for this purpose is provided with a plenum chamber 113 disposed above a treating chamber 116. The product being treated, tomatoes for example, is carried through the treating chamber by a roller type conveyer 117 which is trained about suitable idler and drive sprockets 118 (Figure 2) and is driven by a suitable variable speed motor 119.

The lower surface of the plenum chamber is formed by a partition plate 121 (Figures 3 and 4) having a rectangular array of discharge apertures 122 formed therein. To control the flow of the treating and peeling medium to the partition plate 121, respective adjustable valve plates 123 are provided having apertures 124 which can be aligned with the apertures 122. The amount of opening is controlled by means of a cap screw 126 rotatably connected to each plate 123 and engaged with a nut 128 secured to the side wall. A spacer 127 about the screw 126 fixes the "open" position of the plate 123.

At the upper end of the plenum chamber 113 an entrance pipe 131 for additional air is provided, the opening being controlled by a damper 132 having an adjusting handle 133.

The treating or peeling atmosphere enters the plenum chamber 113 through an angle duct or housing 134 secured at one side of the plenum chamber 113 and having a side opening 135 through which the heating means extends. The means provided for supplying heat to the treating atmosphere is in the form of a conventional gas burner 136 which is disposed in axial alignment with the opening 135 and the entrance to the plenum chamber. The burner 136 receives a suitable gas and air mixture through suitable means including a pipe 137 and a blower 138. Preferably the ratio of gas to air is such that the air supply is sufficient for substantially complete combustion of the gas without providing excess air, as disclosed for example in the co-pending application of Roy M. Magnuson and Traver J. Smith, Serial No. 88,194, filed April 18, 1949, now abandoned, for Process and Apparatus for Treating Fruits and Vegetables. Suitable feed lines 141 and 142 are provided for a pilot flame in the burner.

The angle housing 134 (Figures 2 and 3) has an opening 139 at its bottom which communicates with an upper discharge end or portion of a blower housing 146 having a suitable blower 147 therein driven through a motor 148 by means of a belt and pulley coupling 149.

The exit passage from the treating chamber for the gaseous treating and heating medium is through the apertures or openings provided between the rolls 161 of the roller conveyer 117 and then downwardly into a cleaning chamber 151 through which the lower stretch of the roller conveyer extends. At the opposite end of the cleaning chamber, a transverse steam pipe 152 is provided which effectively clears the treating atmosphere of free pieces of skin so that it enters the conduit 153 forming the entrance to the blower 148 in a substantially clean condition.

The roller conveyer has its rolls positively driven to provide a differential speed relation between adjacent rolls which can be varied with the entire roll assembly capable of variations by a variable speed drive. Preferably the rolls, or certain of the rolls, are provided with a roughened surface to provide the desired amount of drive to the tomatoes undergoing the heat treatment to get the desired results, which include a driving effect to enhance the skin slippage on the tomato.

The rolls 161 (Figures 5 and 6) are connected by suitable chain links 156 and have reduced end portions to engage the sprockets 118 and respective rails 159 which extend through the treating chamber. Also, overlapping plates 157 are mounted on alternate rolls to provide a barrier at the edges of the treating chamber as seen most clearly in Figure 3.

As seen in Figures 5 and 6, the rolls are arranged in alternate series with the rolls in one series having a sprocket 162 at one end and the rolls in the other series having a sprocket 163 at the opposite end. The sprockets, 162 and 163 respectively, are engaged by respective drive chains 165 and 166 which are trained about suitable idler and drive sprockets including drive sprockets 167 and 168. The sprockets 167 and 168 on the drive shaft 169 of the respective chains having different numbers of teeth to provide a difference in speed or rotation between the series of rolls. The drive shaft 169 is suitably driven from a variable speed motor 170. Suitable retaining strips 171 are provided for maintaining the chains engaged with the sprockets 162 and 163.

Each alternate roll is provided with a special surface to obtain the desired drive and in this case the surface is provided by a rectangular wire mesh screen of the desired size so that in effect the surface of the roll is provided with a series of smooth round bars to effect the drive on the tomatoes or other articles. The covering for the rolls may take the form of a conventional welded wire mesh having a rectangular opening of approximately 2" in length and 1" in width as shown for example in Figure 7 and curved to conform to the diameter of the rolls.

Adjacent the entrance and exit of the roller conveyer 117 with respect to the treating chamber, transverse steam pipes 176 and 177 (Figures 2 and 3) are provided having a row of openings directed generally downwardly and slightly inwardly toward the treating chamber, thus providing a steam barrier in the entrance and exit ends of the treating chamber and providing additional moisture in the treating medium if desired.

The machine is first set in operation and the temperature and treating medium conditions allowed to become steady at the desired conditions for the particular tomatoes to be processed. This would include the adjustment of the roll speed of the rollers 161, the adjustment of the speed of the conveyor through the treating chamber, the temperature conditions, the blower speed and the amount of steam to be injected through either one or both of the pipes 176 and 177. With the machine thus conditioned, tomatoes are fed into the feed end of the roller conveyor and carried through the treating chamber being subjected to the downwardly moving treating gases or medium and at the same time being rolled over and over by the differential drive imparted thereto from the rolls.

The treating medium itself, being employed also as a peeling medium in this form of the invention, the first effect of the treating medium on the tomatoes is to effect a blistering of the skins and in effect a separation of the skins from the body of the tomato. Because of the high temperature and high velocity this blistering action is of a different character than ordinary skin loosening and operates with reference to a thin outer layer of skin. Because of the varying conditions of the tomatoes, as to ripeness, for example, this blistering will occur at different positions along the treating chamber in accordance with the length of time required for a particular tomato. However, at the time when blistering does occur, i.e., when skin separation is obtained, the treating medium moving at a velocity in excess of 60 to 75 miles per hour will seize any skin at the point of rupture and strip it free of the tomato. If the skin at the time of rupture is not in a position to be caught by the peeling medium, it may settle back against the article and require later picking off by hand or mechanical means. The peel removal is enhanced by the action of the peeling rolls where the alternate rollers carrying the wire mesh coating are traveling at a greater speed than the other rolls. This gives a selective amount of drive with a certain dragging action which produces slippage of the skin and thereby enhances the peeling action.

Tomatoes which have the peel removed, rather than merely separated, may be still subjected for a time to the hot treating medium, but this will not produce overcooking of the tomatoes because of the moist condition of the body of the article which maintains an insulating layer of vapor at 212° Fahrenheit, and the length of time they remain subjected to the treating atmosphere is insufficient to produce any appreciable drying of the tomato.

Figure 4:
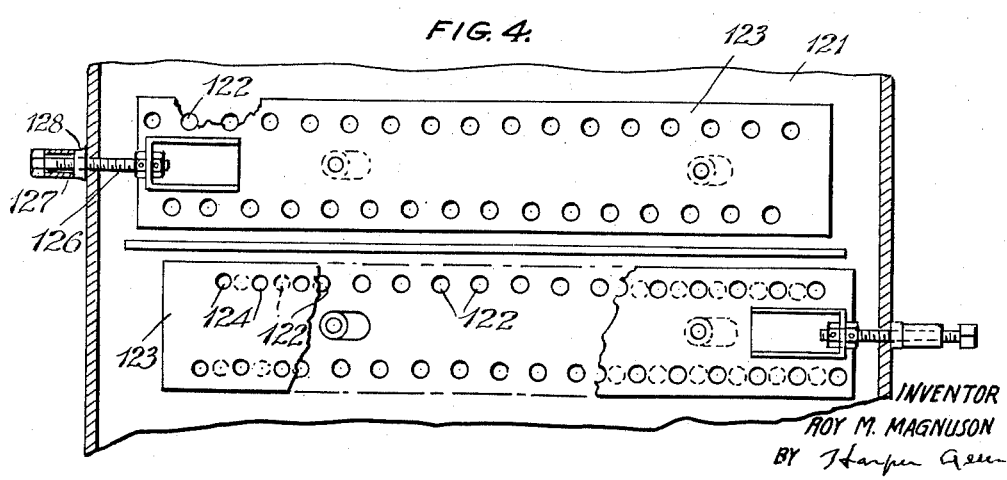
Figure 8:
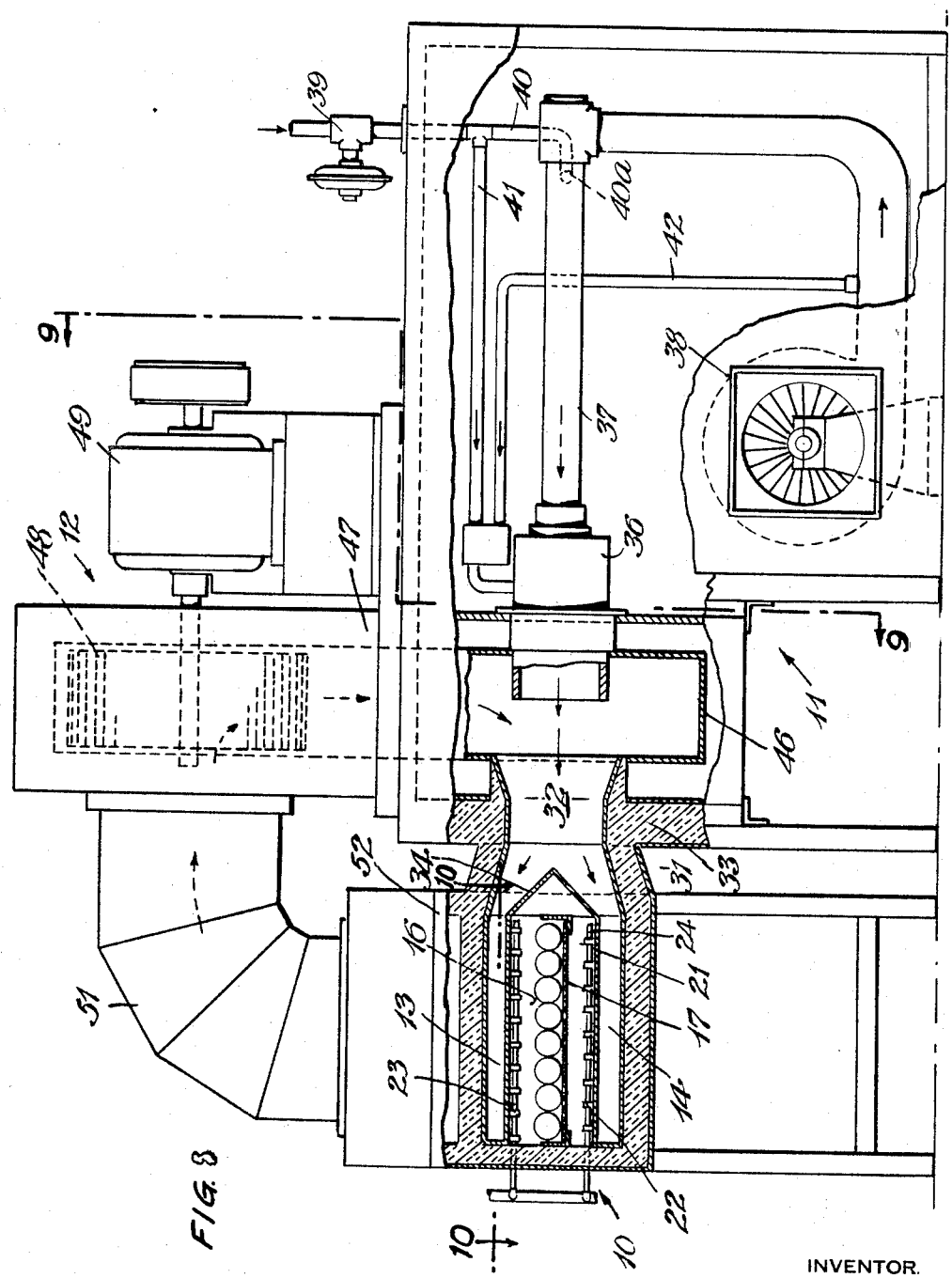
Figure 11:
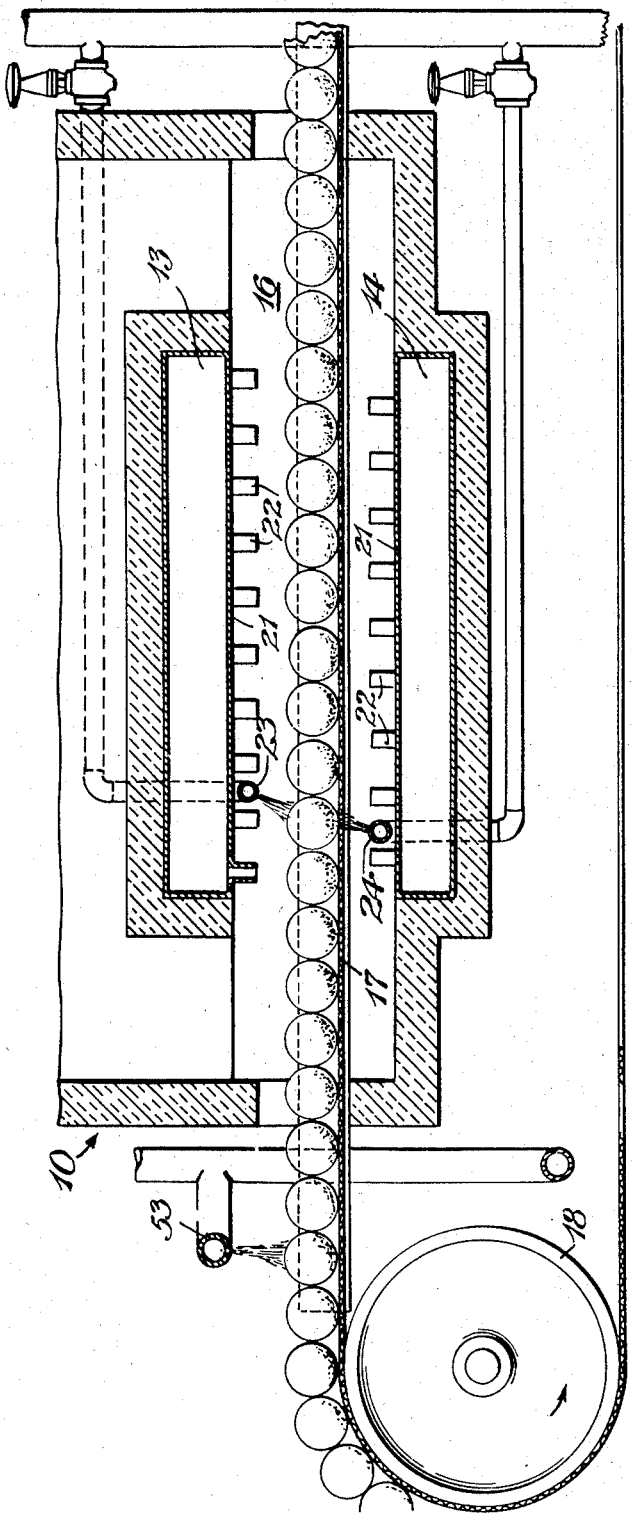

Referring to the modification shown in Figures 8 through 11, the apparatus includes generally a treating unit 10, an atmosphere generating unit 11, and a velocity imparting unit 12. The treating unit 10 is adapted to receive a high velocity treating atmosphere from the combined operations of the units 11 and 12, and for this purpose is provided with upper and lower plenum chambers 13 and 14 respectively above and below a treating chamber 16. The product being treated, tomatoes, for example, is carried through the treating chamber by a perforated or mesh type conveyer 17 which is trained about suitable supporting drums 18, only one of which is shown in Figure 4. The respective partitions between the plenum chambers 13 and 14 and the treating chamber 16 are formed by similar partition plates 21 having a rectangular array of discharge nozzles 22 comprising short sections of pipe secured in the partition plates 21 to direct the flow of the treating atmosphere. Preferably, the pipes in the respective upper and lower partition plates 21 are offset with respect to each other so that no jets are in direct opposed relation.

The treating chamber is also provided near its discharge end with peel removing means comprising respective upper and lower transverse pipes 23 and 24 having a series of perforations therein to direct the peel removing medium. Preferably, the upper pipe 23 has its perforations positioned at about 15° from the vertical toward the discharge end of the machine while the pipe 24 is inclined similarly toward the entrance end, so that the jets issuing therefrom are in opposed relation. However, vertical positioning of the perforations with respect to the conveyer performs satisfactorily. The pipes 23 and 24 are suitably connected to a source of supply of a peeling medium such as steam under pressure or other suitable gas or fluid medium whereby a desired velocity of the peeling medium is provided.

The treating or conditioning atmosphere enters the plenum chambers through a conduit 31 (Figure 8) at one side of the treating chamber, the conduit 31 leading from a Venturi passage 32 provided by an annular throat member 33 of suitable heat resisting material. The passage formed in the conduit 31 is divided by a V-shaped baffle 34 to separate the treating atmosphere into two streams for the respective plenum chambers.

Means are provided for supplying heat to the treating atmosphere and also for supplying additional atmosphere in the form of a conventional gas burner 36 (Figure 8) which is disposed in axial alignment with the throat member 33 and receives a suitable gas and air mixture through a pipe 37 from a blower 38, providing the source of air, and a pipe 40 leading from a gas pressure regulator 39 and having its end 40a disposed within the pipe 37. Preferably, the ratio of gas to air is such that the air supply is sufficient for substantially complete combustion of the gas without providing excess air. Suitable pilot lines 41 and 42 are provided for a pilot flame in the burner.

The burner 36 discharges into a housing 46 which is connected to the burner and to the throat member 33, and forms a suitable involute passage with respect to burner 36 and the throat member 33. The upper end of this housing 46 is connected through duct 47 with the air velocity unit 12 having a conventional blower 48 therein driven by motor 49. The inlet to the air velocity unit 12 comprises a right angle conduit 51 extending between the air velocity unit 12 and with the treating unit 10. A valve-controlled inlet 50 (Figure 9) is provided as a source of additional air in the treating medium if desired. Treating medium discharged from the plenum chambers and the peeling medium discharged from the pipes 23 and 24 passes upwardly at either end of the upper plenum chamber 13 for return through housing 52 of the unit 10 and the conduit 51 to the velocity unit 12.

For cooling of the surface of the product being peeled, a perforated water pipe 53 is positioned transversely about the conveyer 17 ahead of a suitable discharge ramp to which the product is delivered by the conveyer 17.

The nozzles or perforations of the pipes 23 and 24 are preferably in a substantially continuous series above and below the belt, ½ inch transverse spacing being found as sufficient to obtain a good peeling action. As shown, the upper series of nozzles are located to be spaced 2 inches from the tomatoes, and the lower series ½ inch. Preferably, the heat penetration, due to the velocity of the heat-treating medium and the time during which the articles are subjected to it, is sufficient only to allow the desired heat penetration for blistering. Any amount of heating of the layer of the flesh immediately adjacent to the skin is immediately cooled by the water curtain.

The following data is from actual runs on late season tomatoes:

Run Y-6

| | |
|---|---|
| Plenum temperature [1] | 800° F. |
| Gas air mixture | 7.6″ $H_2O$ |
| Fan differential | 6.4″ $H_2O$ |
| Fan r.p.m. | 2290 |
| Exposure time | 12 sec. |
| Treating chamber temperature | 625° F. |
| Percent fancies | 89 |
| Percent yield | 87 |
| Percent peeled | 65 |

[1] Plenum temperature is measured at a central location in one of the plenum chambers.

| Peeling data: | Lbs. |
|---|---|
| Total raw weight | 2445 |
| Total peeled weight | 2285 |
| Weight of fancies | 2080 |
| Weight of standards | 205 |
| Weight of bypass | 152.5 |
| Weight of peels | 167.5 |

Run P-3

This run is comparative with run Y-6 with the labor being paid on an incentive scale.

Machine data:

| | |
|---|---|
| Plenum temperature, °F | 800 |
| Gas air mixture | 8.3″ $H_2O$ |
| Fan differential | 6.4″ $H_2O$ |
| Fan r.p.m. | 2290 |
| Steam (treating chamber jets) | Lower 15 lbs.; upper 22 lbs. |
| Treating chamber temperature, °F | 625 |
| Time interval, sec | 12 |

Peeling data:

| | |
|---|---|
| Raw weight (calculated with 7% machine and core loss) lbs | 3867.5 |
| Total peeled weight lbs | 3379.5 |
| Weight of fancies lbs | 2237.0 |
| Weight of standards lbs | 1147.5 |
| Weight of bypass lbs | 831.0 |
| Weight of peels lbs | 235.0 |
| Percent peeled by process | 60 |

Run 315

The two jets in the treating chamber were turned 15° in the direction of travel of the tomatoes.

Data:

| Run | I | II |
|---|---|---|
| Fan Speed | 2,190 | 2,190 |
| Temp., °F. (Plenum) | 760 | 760 |
| S.P., " $H_2O$ | 4.5 | 4.5 |
| G.A.M., " $H_2O$ | 12.7 | 12.7 |
| Steam (approx.)_____pounds | 20 | 20 |
| Time | 20 | 25 |

Results:

I. 90% peeled by the process. Good quality, some char but not an objectionable amount. The peelability was the best achieved to date.

II. 80% peeled. Some char. Very good quality with the peelability better than run No. I.

Test D-9

Small lots of 25 tomatoes were processed at various temperatures, fan speeds and time intervals to offer a direct comparison of the effect of velocity on the peelability, quality, and percent peeled.

| No. | R. p. m. | Plenum Temp.° F. | Static Pressure (Inches $H_2O$) | Gas Air Mix- (Inches $H_2O$) | Time (Sec.) | Percent Peeled | Peelability of remainder |
|---|---|---|---|---|---|---|---|
| 1 | 2,190 | 500 | 6.4 | 8.4 | 25 | 33½ | Fair. |
| 2 | 2,190 | 600 | 6.7 | 8.4 | 20 | 43 | Good. |
| 3 | 2,190 | 700 | 6.3 | 10.8 | 16 | 33 | Do. |
| 4 | 2,190 | 800 | | | | | |
| 5 | 2,190 | 900 | 6.0 | 11.4 | 12 | 42 | Do. |
| 6 | 2,190 | 1,000 | 6.0 | 11.4 | 12 | 44 | Poor. |
| 7 | 2,290 | 70 | 6.0 | 7.2 | 30 | 0 | |
| 8 | 2,290 | 610 | 6.8 | 8.0 | 30 | 43 | Fair. |
| 9 | 2,290 | 710 | 6.4 | 8.4 | 25 | 25 | Do. |
| 10a | 2,290 | 810 | 6.0 | 8.2 | 15 | 30 | Poor. |
| 10b | 2,290 | 810 | 6.0 | 8.2 | 27 | 60 | Good. |
| 11 | 2,290 | 900 | 5.4 | 9.2 | 14 | 45 | Poor. |
| 12 | 2,290 | 1,000 | 5.4 | 11.4 | 12 | 10 | Bad. |
| 13 | 1,570 | 520 | 3.2 | 4.5 | 30 | 0 | Good. |
| 14 | 1,570 | 610 | 3.0 | 4.2 | 30 | 8 | Fair. |
| 15 | 1,570 | 710 | 2.8 | 4.3 | 25 | 0 | Do. |
| 16 | 1,570 | 810 | 2.6 | 4.2 | 20 | 8 | Good. |
| 17 | 1,570 | 920 | 2.6 | 5.0 | 14 | 8 | Do. |
| 18 | 1,570 | 1,000 | 2.6 | 5.4 | 11 | 4 | Do. |

The above data on runs was taken with the equipment illustrated in Figures 8 to 11.

The following figures are taken from actual production runs on different days with the equipment shown in Figures 1 to 7.

| Total Peelers, Hours | Average Tomatoes Peeled Per Woman Hour | Average Peeled Tomatoes Per Pound | Average Peeling Cost Per Pound Peeled Tomatoes | Average Cases Packed Per Hour |
|---|---|---|---|---|
| 1,060 | 898 | 3.25 | .00458 | 9.72 |
| 1,400 | 912 | 3.25 | .00451 | 9.32 |
| 1,250 | 954 | 5.00 | .00663 | 6.56 |

Other articles can be successfully peeled in the above manner, for example, with white onions, a plenum temperature of from 600 to 650 degrees F., with the given velocities and a treating time of from 11 to 7 seconds, the onions were from 40% to 50% completely peeled and on the balance of onions, the skin could be very easily slip-peeled. With yellow onions, a plenum temperature of from 750 to 800 degrees F. is used with a treating time of from 18 to 12 seconds. The results were from 50% to 60% completely peeled with easy slip-peeling of the balance of the onions. In referring to the peeling of onions, the "peel" referred to is actually an inner layer which consists partially of a dried portion and partially of an undried edible portion.

While I have described a preferred method, it will be obvious that they are capable of variation and modification within the scope of the appended claims.

I claim:

1. The method of removing the thin wax-like outer skin layer of tomatoes while leaving the adjacent gelatinous layer on the body of the tomato, which comprises preparing a gaseous flame-free treating medium by burning fuel to substantially complete combustion, circulating the gaseous treating medium through a path including a treating zone to provide a velocity of the medium of at least 60 to 75 miles per hour through said treating zone, and passing a group of indiscriminately positioned tomatoes through the treating zone to subject them to the high velocity gaseous medium and to effect blistering of the skin of the tomatoes and to remove at least a portion of the skin upon blistering without damaging the flesh of the tomato and without substantially charring of the skin thereof.

2. A method as recited in claim 1 in which the tomatoes are supported in depressions or valleys while passing through the treating zone, and in which the direction of travel of the gaseous medium through the treating zone serves to maintain the tomatoes in the valleys or depressions.

3. The method of removing the skin of fruit and vegetable articles such as tomatoes, white onions and yellow onions, which articles either have an established line of separation of the skin from the body of the article or have a line of separation of the skin from the body capable of being created by treatment with a hot gaseous medium, which comprises preparing a hot gaseous flame-free treating medium including combustion products, circulating the gaseous treating medium through a path including treating zone to provide a velocity of the medium of at least 60 to 75 miles per hour through said treating zone, and subjecting a group of indiscriminately positioned articles in said zone to said high velocity gaseous medium, to thereby effect separation of the skin from the body of the article.

4. The method of removing the skin of fruit and vegetable articles such as tomatoes, white onions, and yellow onions, which articles either have an established line of separation between the skin and the body of the article, or which articles have a line of separation between the skin and the body capable of being created by treatment with a hot gaseous medium, which comprises moving a gaseous medium through a path, applying heat to said medium at one portion of said path to provide a hot gaseous flame-free treating medium including combustion products, effecting a velocity of the medium in the path of at least 60 to 75 miles per hour, and simultaneously subjecting a plurality of indiscriminately positioned articles to the high velocity hot gaseous medium to effect treatment of the skin thereof.

References Cited in the file of this patent

UNITED STATES PATENTS

| 1,243,724 | Fenn | Oct. 23, 1917 |
| 1,647,872 | Leavitt | Nov. 1, 1927 |

(Other references on following page)

UNITED STATES PATENTS

| | | |
|---|---|---|
| 1,948,884 | Patterson | Feb. 27, 1934 |
| 1,984,237 | Southan | Dec. 11, 1934 |
| 1,992,398 | Ryder | Feb. 26, 1935 |
| 2,218,466 | Gray et al. | Oct. 15, 1940 |
| 2,403,923 | Hemmeter | July 16, 1946 |
| 2,445,881 | Hemmeter | July 27, 1948 |
| 2,515,025 | Vahl et al. | July 11, 1950 |
| 2,631,628 | Martin | Mar. 17, 1953 |

FOREIGN PATENTS

| | | |
|---|---|---|
| 120,110 | Australia | June 25, 1945 |